June 15, 1965 A. J. PETZINGER 3,189,821
MAXIMUM-DEMAND MEASURING DEVICE INCLUDING MEANS
FOR PRINTING ONLY THE MAXIMUM VALUES
Filed June 15, 1961 2 Sheets-Sheet 1

WITNESSES
John E. Healey Jr.
James T. Young

INVENTOR
Ambrose J. Petzinger
BY C. L. Freedman
ATTORNEY

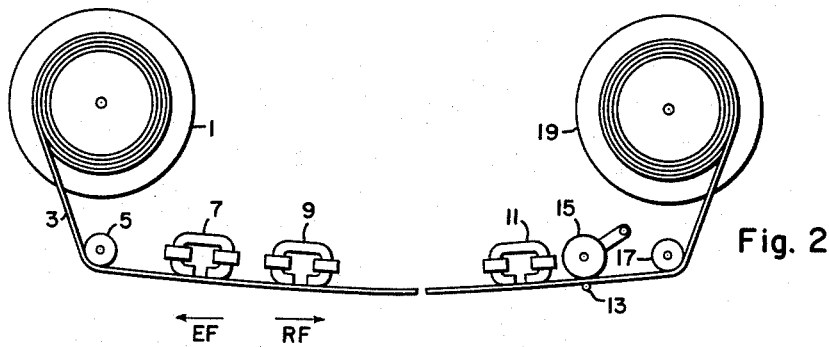
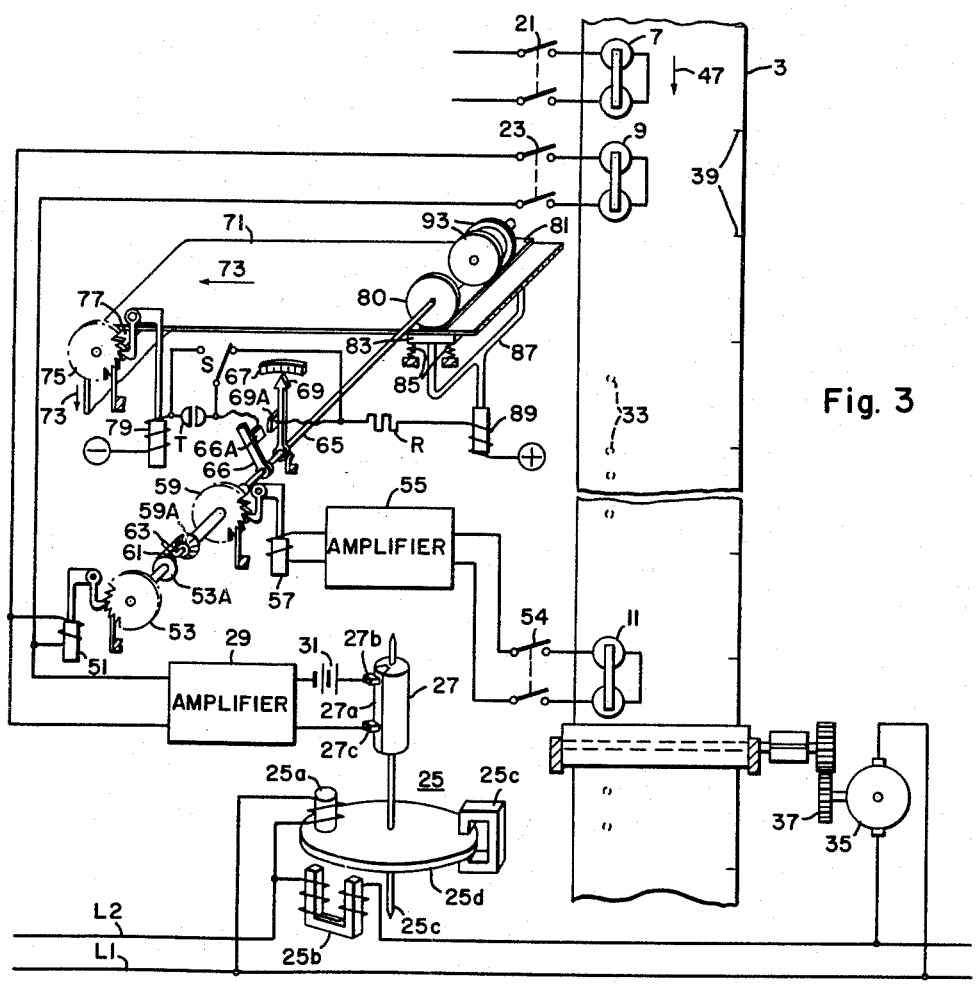

United States Patent Office 3,189,821
Patented June 15, 1965

3,189,821
MAXIMUM-DEMAND MEASURING DEVICE INCLUDING MEANS FOR PRINTING ONLY THE MAXIMUM VALUES
Ambrose J. Petzinger, Glen Rock, N.J., assignor to Westinghouse Electric Corporation, East Pittsburgh, Pa., a corporation of Pennsylvania
Filed June 15, 1961, Ser. No. 117,447
5 Claims. (Cl. 324—103)

This invention relates to a device for measuring the value of a variable quantity for any of a plurality of predetermined intervals, and it has particular relation to a device for measuring the maximum demand of a variable quantity for any of a plurality of timed intervals of predetermined duration.

In accordance with the invention, two values of a variable quantity are repeatedly provided. One is the present integrated value of the variable quantity and the other is a delayed integrated value of the variable quantity. The period of the delay corresponds to the demand interval for which the maximum demand of the variable quantity is to be determined. A differential device is provided for measuring the difference between the integrations of the present value and the delayed value of the variable quantity. The output of the differential device at any instant represents the demand for the demand interval immediately preceding the instant at which it is determined.

The output of the differential device operates mechanisms for determining the maximum value of such output. This maximum value then represents the maximum demand of the variable quantity.

The output of the differential device desirably is employed for controlling a printing unit which applies a printed record of the output of the differential device to a chart at intervals. In a preferred embodiment of the invention such a printed record is produced whenever the output of the differential device exceeds any value of the output which has been printed previously during the period under study.

In a preferred embodiment of the invention, pulses are produced at a rate dependent on the magnitude of a variable quantity which is to be measured. These pulses are recorded on a moving storage member. The pulses are counted at the time they are recorded on the storage member. In addition, each pulse is subtracted from the count of the counting device is a predetermined time after such pulse is recorded. This time corresponds to the interval for which the maximum demand of the variable quantity is to be determined.

It is, therefore, an object of the invention to provide an improved device for measuring the maximum demand of a variable quantity.

It is also an object of the invention to provide a maximum demand measuring device wherein a counter is responsive differentially to present and delayed values of a variable quantity.

Other objects of the invention will be apparent from the following description taken in conjunction with the accompanying drawing, in which:

FIGURE 2 is a schematic view of a magnetic recorder suitable for the invention;

FIGURE 3 is a schematic view with parts shown in perspective and parts broken away showing a portion of the recorder of FIG. 2 associated with components for supplying information thereto and components for utilizing information therefrom.

Figure 1:
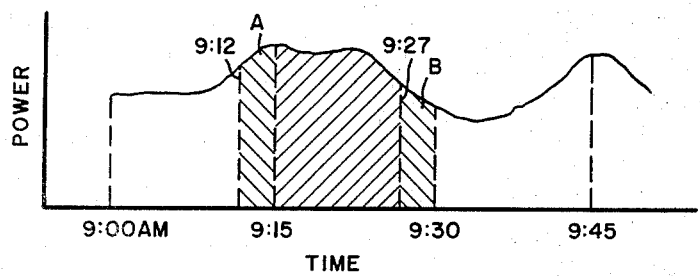
FIGURE 1 is a graphical representation of power supplied to a load.

Some of the problems encountered in measuring the maximum demand of the variable quantity may be considered by reference to the graphical representation of FIG. 1 wherein ordinates represent power being supplied over an electrical circuit to a load and wherein abscissae represent the time of the day. In the block interval approach to the measurement of maximum demand, a billing period is divided into a plurality of successive demand intervals, three of which are shown in FIG. 1. Thus, in FIG. 1 a demand interval of fifteen minutes duration occurs between 9 a.m. and 9:15 a.m. A second demand interval occurs between 9:15 a.m. and 9:30 a.m. and a third demand interval occurs between 9:30 a.m. and 9:45 a.m. For these three demand intervals inspection of FIG. 1 shows that the maximum demand occurs between 9:15 a.m. and 9:30 a.m. However, it will be noted that the power demand A between 9:12 a.m. and 9:15 a.m. is substantially larger than the demand B between 9:27 a.m. and 9:30 a.m. For this reason the block interval maximum demand measuring device may fail to show the maximum demand occurring during any fifteen minute period of time. The reason for this failure sometimes is referred to as "peak splitting."

In order to eliminate peak splitting, a measurement is made at virtually any instant for the demand interval terminating at such instant. To this end, the invention includes apparatus for delaying measured values of a variable quantity for a period equal to the demand interval. Such apparatus conveniently may be based on the load survey recorder which is available on the market and which is disclosed in the J. M. Wallace et al., patent application Serial No. 619,584 now abandoned, filed October 31, 1956, in the K. L. Campbell patent application Serial No. 743,150 now abandoned, filed June 19, 1958, and in the B. E. Lenehan patent application Serial No. 743,149 now Patent No. 3,148,329, filed June 19, 1958, all assigned to the assignee of the present patent application.

Referring to the drawing, FIG. 2 shows a magnetic recorder which may be of conventional construction. The recorder illustrated in FIG. 2 includes a payout reel 1 on which a flexible elongated magnetic member 3 may be wound. The magnetic member 3 may be of any suitable material capable of receiving and retaining a magnetic record therein. It may take the form of a flexible ribbon of magnetically-hard steel, but preferably it is in the form of a magnetic tape having a base constructed of a material such as paper or a plastic. The base is coated with a thin coating of magnetically-hard material. Such tapes are well known in the art.

The magnetic tape leaving the payout reel is guided in a predetermined path by means of a guide roller 5, an erase head 7, a record head 9, a reproduce or a pickup head 11, a capstan 13 against which the tape is biased by means of a suitable biasing roller 15, and a guide roller 17 to a takeup reel 19. Although they are shown on spaced axes, the reels 1 and 19 may be mounted adjacent each other on a common axis for compactness. It will be understood that the various reels and rollers are mounted on a suitable supporting structure (not shown) for rotation about their respective axes.

In a preferred embodiment of the invention, the erase head 7 comprises a magnet for establishing a constant magnetic field in the path through which the magnetic tape moves. This field is designed to magnetize the magnetic tape to saturation in one direction and thus "erases" any magnetic record in the tape. The magnet may be either a permanent magnet or an electromagnet energized from a source of direct current.

The record head 9 is in the form of an electromagnet for establishing a magnet field in the path through which the magnetic tape moves. The windings of the electromagnet are energized in accordance with a quantity to be measured. The record head 9 preferably is spaced in the direction of travel of the tape 3 from the erase head 7 for a distance sufficient to prevent overlap of their fields.

The reproduce or pickup head 11 is illustrated as another electromagnet similar to the record head. If the magnetic tape has a magnetic record therein, the movement of the tape past the reproduce head induces a voltage in the windings of the reproduce head which is representative of the magnetic record carried by the tape. The output of the windings may be supplied to suitable translating means in the manner hereinafter set forth.

The capstan 13 is rotated at a substantially uniform rate for the purpose of advancing the magnetic tape past the heads at a substantially uniform rate which may be less than 2 inches per minute. The takeup reel 19 is biased to take up the magnetic tape as it is fed by the capstan.

The structure illustrated in FIG. 2 may be based on a magnetic recorder of conventional construction. For example, a magnetic recorder is discussed in a book entitled "Sound Recording" by John G. Frayne and Halley Wolfe, published by John Wiley & Sons, Inc. of New York City in 1949.

FIG. 3 shows a portion of the magnetic tape 3 together with the erase head 7, the record head 9 and the reproduce head 11. The erase head 7, if of the electromagnet type, may be connected through a suitable two-pole single-throw switch 21 to a direct-voltage source. As previously pointed out, the erase head also may be a permanent magnet for saturating the magnetic tape in a predetermined direction. The magnetic field produced by the erase head passes through the magnetic tape in the direction of the arrow EF.

The record head 9 is connected through a two-pole single-throw switch 23 to a measuring unit 25 having an output representative of the quantity to be measured.

In a preferred embodiment of the invention, the unit 25 is responsive to power flowing in an electrical circuit represented by conductors L1 and L2. For example, this circuit may be a single-phase alternating-current circuit operating at a frequency of 60 cycles per second for the purpose of supplying power from a generator to a load. The unit 25 has a stator which includes an electromagnet providing a voltage pole 25a having a winding connected for energization in accordance with the voltage across the conductors L1 and L2. Current poles 25b are provided with windings connected for energization in accordance with current flowing in the conductor L2. A permanent magnet 25c also forms part of the stator.

The unit 25 also includes a rotor represented by an electroconductive armature or disc 25d which is mounted for rotation relative to the stator on a shaft 25e. The armature 25d is positioned in the air gap of the electromagnet formed by the poles 25a and 25b and in the air gap of the permanent magnet 25c. The unit 25 thus takes the form of a conventional watthour meter and the rotor rotates at a rate dependent upon power flowing in the conductors L1 and L2.

The rotation of the shaft 25e is utilized to produce pulses occurring at a frequency dependent on the rate of rotation of the shaft. Although short, sharp pulses may be produced in the manner set forth in the aforesaid Campbell and Lenehan patent applications, for purposes of simplification it will be assumed that such pulses are produced by a commutator 27 mounted on the shaft 25e. The commutator 27 includes an insulating body containing a conductive bar 27a which is positioned to bridge two brushes 27b and 27c briefly during each rotation of the commutator. Such connection of the brushes connects a battery 31 or other source of voltage across the input terminal of an amplifier 29. The output of the amplifier is supplied to the record head 9 through the switch 23.

From the foregoing discussion it is clear that as the shaft 25e rotates, pulses are applied to the record head 9. Each of the pulses is magnetically recorded in the magnetic tape 3. Although such pulses are invisible to the eye, positions of representative pulses 33 are illustrated in FIG. 3. The spacing of the pulses depends on the rate at which power is supplied by the conductors L1 and L2.

If the magnetic tape 3 is premagnetized to saturation in the direction represented by the arrow EF by the erase head 7, the opposite polarity of magnetization represented by the arrow RF is applied by the record head 9 to magnetize the tape to saturation in the direction of the arrow RF for each of the pulses.

In order to feed the magnetic tape 3 past the heads, the capstan 13 is coupled to a motive device such as an electric motor 35 through suitable coupling means 37. The electric motor 35 when energized is designed to operate at a substantially constant speed and may take the form of a conventional synchronous motor. By providing a suitable speed reduction in the coupling 37, the motor 35 may be of a reasonably high-speed type.

The parts are so proportioned that the time required for a point on the magnetic tape 3 to travel from the record head 9 to the reproduce head 11 is equal to a demand interval. Various demand intervals such as fifteen minutes, thirty minutes, and sixty minutes have been employed in the past. For present purposes, it will be assumed that a demand interval of fifteen minutes is employed.

The number of pulses between the record head 9 and the reproduce or pickup head 11 represent the power demand for the fifteen minute interval immediately prior to the counting of the pulses. The pulses between the heads 9 and 11 are counted continuously by a differential counter which measures the difference between the pulses supplied to the record head 9 and the pulses supplied by the reproduce or pickup head 11.

The pulses supplied by the amplifier 29 to the record head 9 also are supplied to a solenoid 51 which operates a pawl to advance a ratchet wheel 53. Each energization of the solenoid 51 advances the ratchet wheel 53 one step. Consequently, the ratchet wheel adds or integrates the pulses supplied by the amplifier 29.

Pulses supplied by the reproduce or pickup head 11 may be referred to as delay pulses and are supplied to the input of an amplifier 55 through a switch 54. The output of this amplifier is supplied to a solenoid 57. The solenoid 57 operates a pawl which advances a ratchet wheel 59 one step for each pulse supplied to the solenoid 57.

The ratchet wheel 53 may be referred to as a present-pulse ratchet wheel and integrates the present pulses supplied by the record head 9. The ratchet wheel 59 may be referred to as a delayed-pulse ratchet wheel and integrates the delayed pulses supplied by the record head 11. The difference between the rotations of the ratchet wheels 53 and 59 represents the number of pulses 33 between the heads 9 and 11. Such a difference represents the demand in a continuous manner for the fifteen minute demand interval represented by the spacing of the heads 9 and 11. This difference may be shown on a counter responsive to the difference between the rotations of the ratchet wheels 53 and 59.

In the specific embodiment of FIG. 3, the differential counter employs differential gearing. The differential gearing comprises a bevel gear 53A which is connected to the ratchet wheel 53 for rotation therewith about a common axis. A bevel gear 59A is connected to the ratchet wheel 59 for rotation therewith about a common axis. These two bevel gears are differentially associated with a bevel gear 61 which is mounted for rotation about a shaft 63 which is at right angles to the axis of the bevel gears 53A and 59A and which intersects such axis. The shaft 63 is secured to a shaft 65 which extends rotatably through the bevel gear 59A and the ratchet wheel 59 and which is concentric therewith. This shaft has secured thereto a pusher arm 66 which continuously shows the angular position of the shaft relative to a scale 67. Consequently, the angular position of the pusher arm 66 about its axis indicates on the scale 67 the difference between the pulses supplied to the record head 9 and the pulses supplied by the record head 11. The scale may be calibrated to indicate the power demand for the fifteen minute interval immediately preceding each reading.

A maximum-demand pointer 69 is mounted for independent rotation about the axis of the shaft 65. This pointer 69 is so mounted that it remains in any position to which it is moved. The pointer 69 has a portion 69A in the path of movement of the pusher arm 66. Consequently, as the pusher arm 66 moves in a clockwise direction as viewed in FIG. 3 its portion 66A engages the pointer portion 69A to push the pointer up scale. When the pusher arm 66 thereafter moves in a counterclockwise direction, the maximum-demand pointer 69 remains in its position of maximum advance. Consequently, the maximum-demand pointer indicates on the scale 67 the maximum demand of power for any fifteen minute interval during a billing period. The billing period may for example have a duration of one month. Such maximum-demand pointers are well known in the art.

A permanent record of the power demand is formed on a strip chart 71 which is mounted for movement in the direction of an arrow 73. The chart is moved in the indicated direction by means of a ratchet wheel 75 which is secured to a feed roll 77. When a solenoid 79 is energized, it operates a pawl to rotate the ratchet wheel 75 one step for the purpose of feeding the strip chart 71 for a small distance in the direction of the arrow 73.

A printing unit operated by the shaft 65 is positioned adjacent the strip chart 71 for the purpose of applying a printed record to the chart. This printing unit is represented by a printing drum 80 which is mounted on the shaft 65 for rotation therewith. The printing drum 80 has type numerals on its periphery which are moved in accordance with rotation of the shaft 65 to present the correct numeral adjacent the strip chart 71. An ink ribbon 81 is located between the printing drum 80 and the strip chart.

A flat platen 83 is located below the strip chart adjacent the printing drum 80. This platen rests on springs 85 which position the platen slightly below the strip chart. The platen 83 is secured to a bracket 87 which in turn is secured to an iron armature of a solenoid 89. When the solenoid is energized, it pulls the platen 83 downwardly as viewed in FIG. 3 to compress the springs 85. When the solenoid thereafter is deenergized, the springs force the platen 83 upwardly and cause the printing drum 80 to print a record of its position on the strip chart 71. The printing drum 80 is calibrated to print the power demand for the immediately preceding demand interval for each printing operation thereof.

Other information also may be printed on the strip chart. For example, printing drums 93 may be located above the ink ribbon 81 for the purpose of applying a record of the time and date for each operation of the platen 83. The drums 93 may be operated by a timing motor in a manner well understood in the art.

When a switch S is in the position illustrated in FIG. 3, the printing operations are controlled by contacts T of a time switch. Such a switch is well known in the art and may be employed to close its contacts briefly at repeated intervals of any desired duration such as intervals of one minute.

Each closure of the contacts T connects the solenoids 79 and 89 through a resistor R across a source of direct current represented by the polarity marks plus and minus. As a result of such energization, the solenoid 79 operates its pawl to advance the ratchet wheel 75 and thereby to advance the strip chart 71 for a new printing operation. In addition the solenoid 89 is energized to lower the platen 83 and to compress the springs 85. When the contacts T of the time switch reopen the resulting deenergization of the solenoid 79 resets its associated pawl without affecting the position of the strip chart. In addition, the deenergization of the solenoid 89 permits the springs 85 to force the platen 83 towards the printing drums for the purpose of applying a new printed record to the strip chart 71.

In order to conserve the amount of strip chart required, the printing unit may be designed to operate only when a demand is reached which is larger than any previous demand which occurred during the billing period. Let it be assumed that the blade of the switch S is operated to a central position wherein it engages neither of its associated fixed contacts. The pusher arm 66 is provided with a contact 66A and the maximum demand pointer 69 also is provided with a contact 69A. These contacts are insulated from each other and are brought into engagement when the pusher arm 66 reaches the maximum demand pointer 69. As long as the contacts 66A and 69A are separated the solenoids 79 and 89 cannot be energized and no printing operation takes place.

When the demand indicated by the pusher arm 66 reaches the demand indicated by the maximum demand pointer 69 the contacts 66A and 69A engage to prepare the solenoids for energization. Such energization thereafter is effected when the contacts T of the timing switch close. Therefore as long as the present demand is at least as great as the demand indicated by the maximum demand pointer 69 the printing units can operate to produce a printed record on the strip chart 71.

A further operation may be obtained by moving the blade of the switch S to the left as viewed in FIG. 3 to shunt the contacts T. Under these conditions, when the contacts 66A and 69A engage each other they produce a circuit energizing the solenoids 79 and 89. As a result of its energization the solenoid 79 operates its associated pawl to advance the strip chart 71. The energized solenoid 89 lowers the platen 83 preparatory to a printing operation thereof. The pusher arm 66 pushes the maximum-demand pointer 69 up scale to a higher position. When the demand subsequently decreases the contact 66A moves away from the contact 69A to deenergize the solenoids 79 and 89. Deenergization of the solenoid 79 resets the associated pawl. Deenergization of the solenoid 89 permits the springs 85 to raise the platen 83 thereby completing a printing operation. Thus when the contacts 66A and 69A are effective for controlling the energization of the solenoids 79 and 89 the last record applied to the strip chart 71 represents the largest printed value of power demand.

Time pulses or marks may be applied to the right-hand edge of the magnetic tape 3 as viewed in FIG. 3 in the manner set forth in the previously mentioned patent applications. For present purposes, it will be assumed that equally-spaced timing marks 39 are applied to the right-hand edge of the tape.

The operation of the system illustrated in FIGS. 2 and 3 now may be briefly reviewed. It will be assumed that the magnetic tape 3 is in the position illustrated and that the motor 35 is energized to move the magnetic tape in the direction of the arrow 47 (FIG. 3). It is also assumed that the watthour meter 25 is in operation for the purpose of measuring power supplied from a source to a load over the conductors L1 and L2. For each rotation of the commutator 27 the bar 27a engages its associated brushes to apply an input pulse to the amplifier 29. The amplified output of the amplifier 29 is applied to the solenoid 51 for the purpose of rotating the pusher arm 66 and the printing drum 80 one step in the increase direction. In addition the amplified output of the amplifier 29 applies a pulse to the record head 9 for the purpose of applying a pulse 33 to the magnetic tape.

Fifteen minutes after it is applied to the magnetic tape, each of the pulses 33 reaches the reproduce or pickup head 11 and supplies an input to the amplifier 55. The amplified output of the amplifier energizes the solenoid 57 to move the pusher arm 66 and the printing drum 80 one step in the decrease direction. Thus these two parts always occupy a position corresponding to the number of pulses 33 located on the magnetic tape between the record head 9 and the reproduce or pickup head 11.

It will be assumed that the switch S is in the position illustrated in FIG. 3. With the switch so positioned each closure of the contacts T of the time switch completes an energizing circuit for the solenoids 79 and 89 to apply a printed record to the strip chart 71. This printed record represents the demand for the immediately preceding demand interval.

If desired, pulses may be applied to the magnetic tape 3 in the manner set forth in the previously mentioned patent applications. The magnetic tape then may be removed from the recording apparatus and subsequently mounted in the position illustrated in FIGS. 2 and 3 for the purpose of applying a printed record to the strip chart 71. In such a case, the switch 21 would be opened to deenergize the erase head 7. In addition, the record head 9 now would function as a pickup or reproducer head. The output of this head is now applied to the solenoid 51 to advance the ratchet wheel 53 one step for each pulse 33 passing beneath the head 9. If necessary the output of the head 9 may be amplified for the purpose of increasing the energy supplied to the solenoid 51. The head 11 operates in the manner previously discussed for the purpose of advancing the ratchet wheel 59 one step for each pulse 33 reaching the head 11. If the drums 93 are employed to indicate the date and the time of the day, these drums should be adjusted into agreement with the previously prepared magnetic tape 3.

In the embodiment thus far discussed the magnetic tape 3 is in the form of a strip of finite length. It may be arranged to move in the direction of the arrow 47 (FIG. 3) at the rate of 2.35 inches for each rotation of the capstan 13. The movement may be of the order of one-sixth of an inch per minute. Magnetic tape of conventional construction having a width of one-quarter inch may be employed. With the parameters thus far discussed, a tape having a length of 600 feet is adequate for operation for a period of one month and may be wound on a reel having a diameter of less than 4 inches. At the end of the period the magnetic tape may be removed for storage purposes or further study and another magnetic tape may be loaded on the payoff reel to permit operation for a succeeding month at the same location or at a different location as desired. Alternatively at the end of the month the magnetic tape may be rewound on the payoff reel for reuse.

Figure 4:
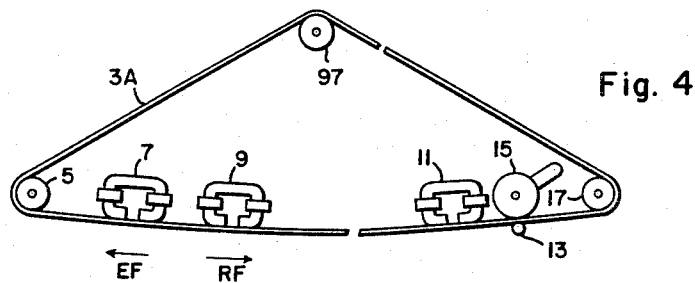
FIGURE 4 is a view in side elevation showing a modified magnetic tape arrangement for the magnetic recorder.

If desired the system of FIGS. 2 and 3 may be arranged to employ a continuous or endless magnetic tape 3A. This arrangement is illustrated in FIG. 4 by a roller 97 which is added to the apparatus of FIG. 2. An endless tape may be arranged to extend around the rollers 5, 17 and 97 as illustrated in FIG. 4. The erase head 7 erases any record present on the endless tape before the record reaches the record head 9.

Although the invention has been described with reference to certain specific embodiments thereof, numerous modifications falling within the spirit and scope of the invention are possible.

I claim as my invention:

1. In a maximum-demand measuring device for measuring the maximum demand of a variable quantity, pulse means effective when energized by the variable quantity for producing pulses at a rate dependent on the magnitude of the quantity, a counting device for counting said pulses, subtraction means responsive to said pulses after a predetermined time delay for operating said counting device subtractively, and recording means for printing a first reading of the counting device during a billing period, said recording means operating to print a second reading of the counting device only if such second reading is at least as large as the first reading of the counting device.

2. In a maximum-demand measuring device for measuring the maximum demand of a variable quantity, a magnetic recording device for recording information on said magnetic member, a magnetic pickup device for picking up information recorded on said magnetic member, means for transporting the magnetic member at a uniform rate successively past said recording device for receiving information therefrom and thereafter past the pickup device for transmitting such recorded information to the pickup device, said recording and pickup devices being spaced by a distance requiring a substantial predetermined interval for a point on the magnetic member to travel from the recording device to the pickup device, and counting means differentially responsive to pulses supplied to the recording device for recording on the magnetic member and pulses picked up by the pickup device, said counting means comprising a printing unit for presenting a representation in type of the reading of the counting means, a record member for receiving a printed record from said printing unit, feed means for moving the record member past said printing unit and printing means for operating said printing unit to print a first reading on the record member, said printing means being responsive only to appearance of a second reading of the counting means at least as large as the first reading of the counting means for operating the printing unit to print a record of the second reading of the counting means on the record member.

3. In a maximum-demand measuring device for recording the maximum demand of a variable quantity on a record element, a printing unit operable for selecting any of a number of readings to be printed, means controllable by a variable quantity for operating the printing unit to select a reading corresponding to the value of said variable quantity, a record member for receiving a printed record from the printing unit, means mounting the record member for movement relative to the printing unit for presenting a fresh portion of the record member to receive a printed record for each operation of the printing unit, printing means operating the printing unit to print a first reading of the printing unit on the record member, and advancing means for intermittently advancing the record member for each printing operation of the printing unit, said printing means operating the printing unit to print a second reading of the printing unit on the record member only if such second reading is larger than the first reading.

4. In a maximum-demand measuring device for recording the maximum demand of a variable quantity on a record element, a printing unit operable for selecting any of a number of readings to be printed, means controllable by a variable quantity for operating the printing unit to select a reading corresponding to the value of said variable quantity, a record member for receiving a printed record from the printing unit, means mounting the record member for movement relative to the printing unit for presenting a fresh portion of the record member to receive a printed record for each operation of the printing unit, printing means operating the printing unit to print a first reading of the printing unit on the record member, and advancing means for intermittently advancing the record member for each printing operation of the printing unit, said printing means operating the printing unit to print a second reading of the printing unit on the record member only if such second reading is larger than the first reading, said printing unit including timing means for printing on the record member a time indication for each operation printing unit by the printing means.

5. In a maximum-demand measuring device for printing the maximum demand of a variable pulsed quantity, a printing unit effective when energized by a variable pulsed quantity for presenting a printable reading dependent in value at any instant on the number of pulses in such pulsed quantity during an immediately preceding time interval of predetermined duration, a record member for receiving a printed record from the printing unit, means mounting the record member for movement relative to the printing unit for presenting a fresh portion of the record member to receive a printed record for each operation of the printing unit, printing means operating the printing unit to print a first reading of the printing unit on the record member, and advancing means for intermittently advancing the record member for each printing operation of the printing unit, said printing means operating the printing unit to print a second reading of the printing unit on the record member only if such second reading is larger than the first reading, said printing unit including timing means for printing on the record member a time indication for each operation printing unit by the printing means.

References Cited by the Examiner
UNITED STATES PATENTS

| | | | |
|---|---|---|---|
| 1,664,243 | 3/28 | Chubb | 324—103 |
| 1,697,166 | 1/29 | Davis | 324—112 |
| 2,190,497 | 2/40 | Whitby | 324—103 |
| 2,424,218 | 7/47 | Begun | 324—112 |
| 2,431,125 | 11/47 | Klaus | 324—103 |
| 2,539,835 | 1/51 | Heynisch | 324—103 |

WALTER L. CARLSON, *Primary Examiner.*